(12) United States Patent
Lee

(10) Patent No.: US 6,969,927 B1
(45) Date of Patent: Nov. 29, 2005

(54) POWER SWITCHING APPARATUS

(75) Inventor: Kwok Kit Patrick Lee, Hong Kong (HK)

(73) Assignee: Clipsal Asia Holdings Limited, (HK)

( * ) Notice: Subject to any disclaimer, the term of this patent is extended or adjusted under 35 U.S.C. 154(b) by 0 days.

(21) Appl. No.: 10/875,696

(22) Filed: Jun. 25, 2004

(51) Int. Cl.[7] ............................................. H02J 1/00
(52) U.S. Cl. ......................................... 307/32; 307/17
(58) Field of Search ........................ 307/17, 31, 32, 307/35, 39; 361/93.1, 93.9

(56) References Cited

U.S. PATENT DOCUMENTS

| 4,751,607 A | * | 6/1988 | Smith ...................... 361/119 |
| 6,259,610 B1 | | 7/2001 | Karl et al. |

FOREIGN PATENT DOCUMENTS

GB    2 099 243 A    12/1982

* cited by examiner

Primary Examiner—Shawn Riley
(74) Attorney, Agent, or Firm—Buchanan Ingersoll PC

(57) ABSTRACT

A power switching apparatus comprising a current transformer with coupled primary and secondary windings, the primary windings being adapted for series connection between alternate current power source and load, the primary windings comprising first and second sub-primary windings of different number of turns of windings and respectively of a larger and a smaller core diameter, a current conduction path being provided from intermediate the first and the second sub-primary windings to the power switching means so that upon detection of a current exceeding the current rating of the second sub-primary windings, current will be caused to flow from alternate current power source to load via a current loop comprising the power switching means and the first sub-primary windings only.

21 Claims, 7 Drawing Sheets

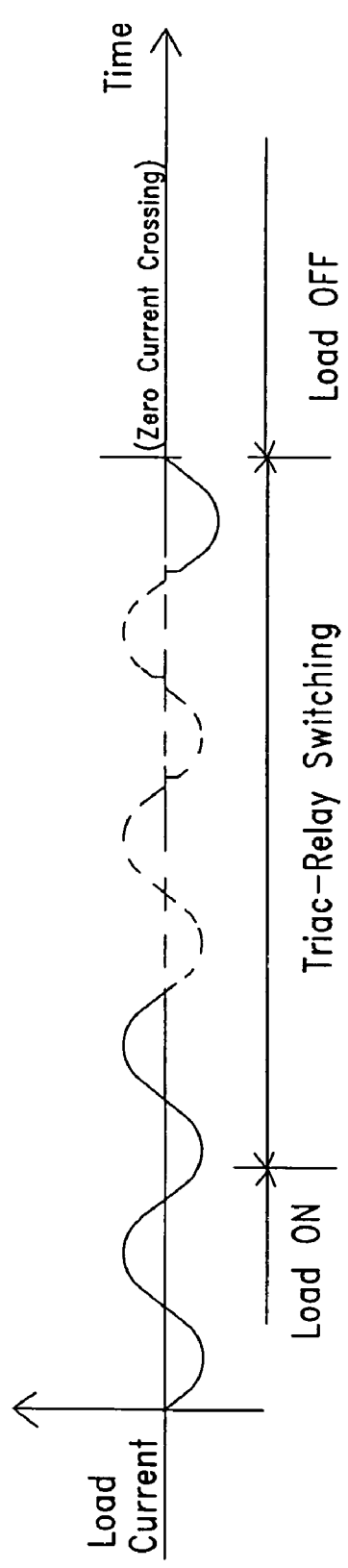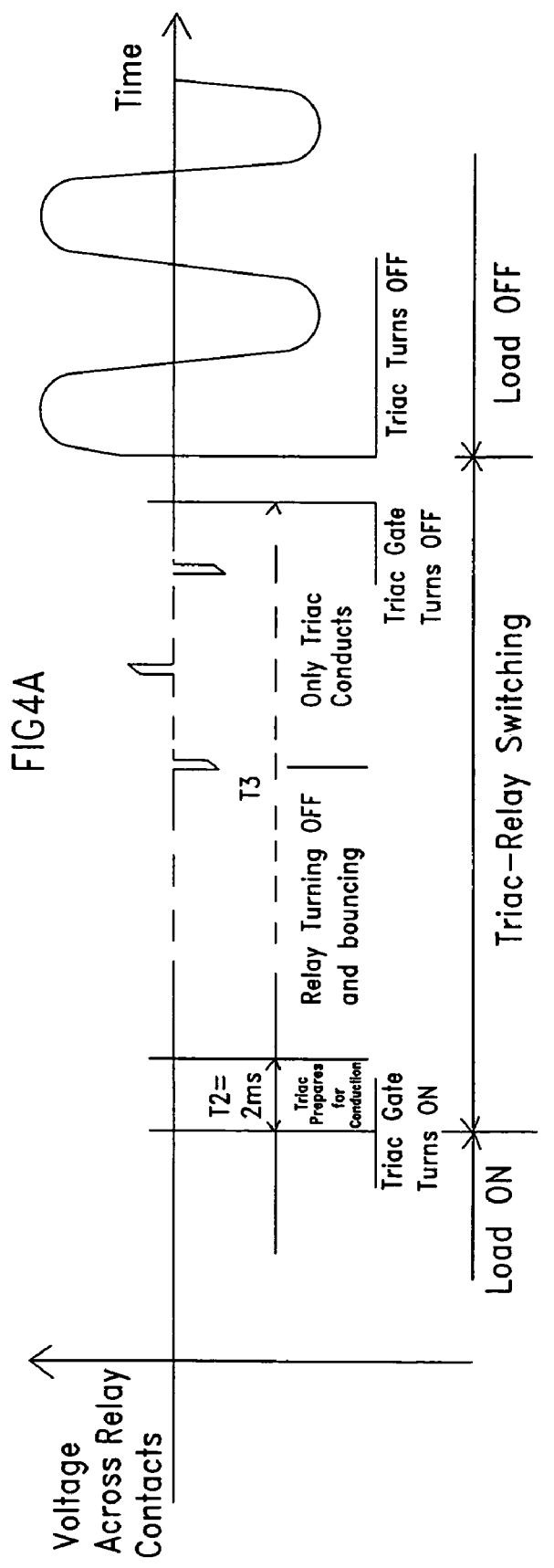

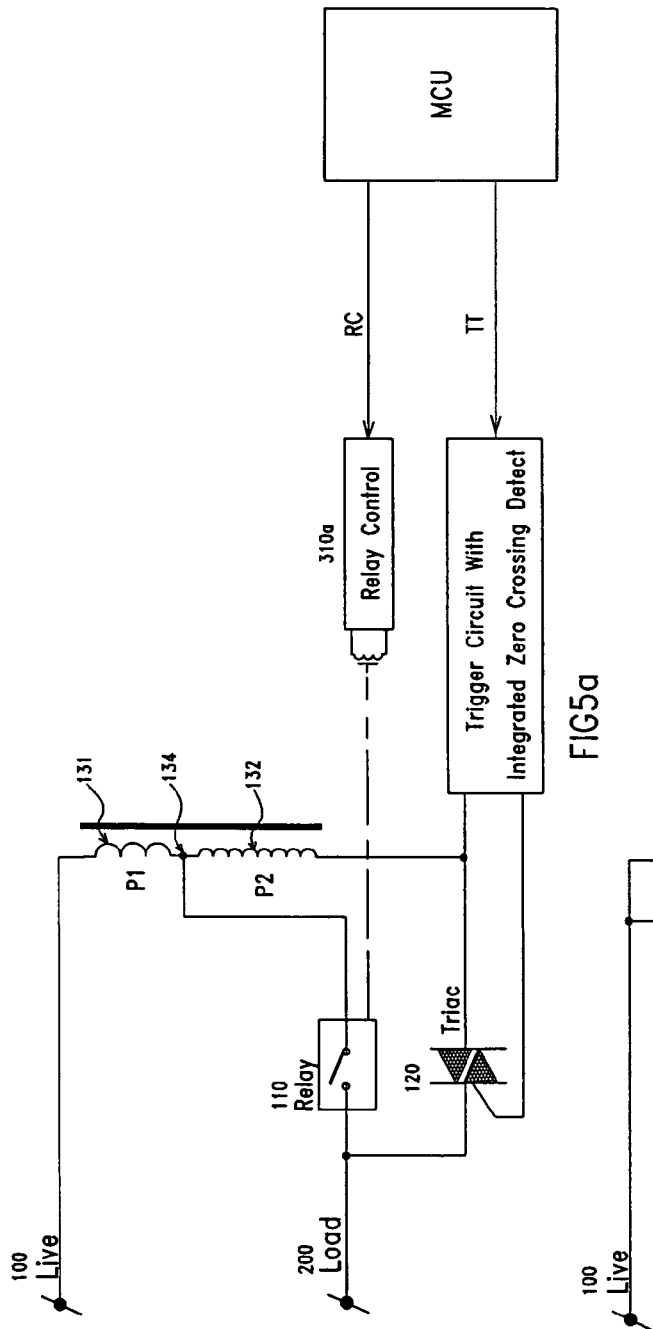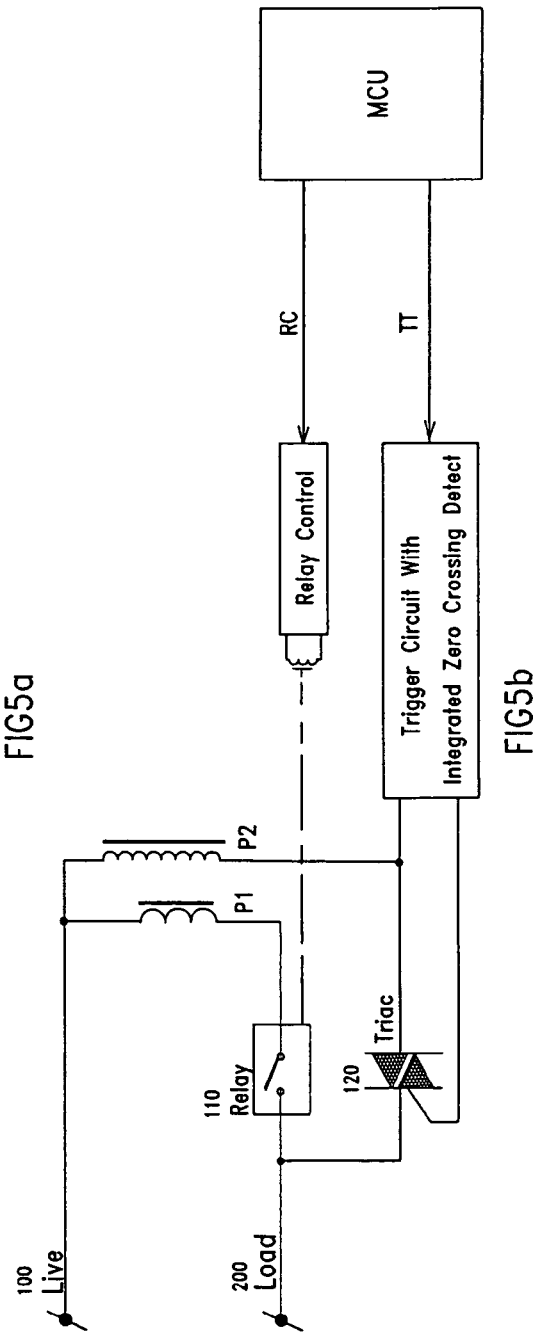
FIG5a
FIG5b

SW i = Power switch device i, i =1,2 — — — n.
(eg. Relay, Triac, Mosfet, — — —)

1.) $R_i$ = VI Rating of SW i :

$R_1 > R_2 > R_3 > ... > R_{n-1} > R_n$

2.) N = No. of turns of primary coil :

$(N)_{p1} < (N)_{p2} < (N)_{p3} < ... < (N)_{pn-1} < (N)_{pn}$

3.) D = Diameter of primary winding $(D)_{p1} > (D)_{p2} > (D)_{p3} > ... > (D)_{pn-1} > (D)_{pn}$

POWER SWITCHING APPARATUS

FIELD OF THE INVENTION

The present invention relates to electronic controlled power switching apparatus and, more particularly, to line-powered electronic controlled power switching apparatus. More specifically, although of course not solely limited thereto, this invention relates to line-powered electronic controlled power switching apparatus for use in a two-wire system. This invention also relates to multi-gang line-powered electronic controlled power switching apparatus with a relay adapted for a high current handling capability and relay protection means.

BACKGROUND OF THE INVENTION

Electronic controlled power switching apparatus provide useful alternative to conventional rocker-type switches so that power switching, for example, switching of electrical appliances and lighting apparatus, can be done by remote or wireless controlled switching, non-contact switching, touch switching or other intelligent or more sophisticated switching methods.

Electronic controlled power switching apparatus are typically controlled and operated by electronic control means which comprise, for example, a microprocessor. The electronic control means operate the making or breaking of an electronic controllable power switching device inside the power switching apparatus upon receipt of a control command or upon fulfilment of certain prescribed conditions. In order to provide an economical and relatively maintenance-free electronic controlled power switching apparatus, it is highly desirable that the power for operating the control and other peripheral circuitry of the switching apparatus is obtained from the alternate current (AC) power source to which the power switching apparatus is connected so that batteries are not essential to its operation. In many power distribution wiring networks, for example, networks at home or offices, extra power supply lines are not readily available to cater for the operating power requirements of an electronic controlled power switching apparatus.

To obviate the need of additional wirings for supplying operating power to the electronic control circuitry, electronic controlled power switching apparatus with power coupling means, which comprise a current transformer and a voltage transforming circuitry (such as voltage clamping circuitry) for coupling operating power from the AC power source to the rectifying circuitry of the power switching apparatus respectively during the "ON" and "OFF" states, are known. The primary windings of the current transformer are usually connected in series with and between the AC power source and the load. Because of the serial connection, a high current rating current transformer, typically with windings of copper wire of a large core diameter, will be required for a high load current rating, since copper wire of a large cross-section is desirable for reducing adverse heat generation. On the other hand, for an electronic controlled power switch with a low load current rating, a current transformer with a large number of turns in the primary winding is necessary to maintain sufficient operating power to the control and peripheral circuitry. Hence, an electronic controlled power switch with a large current rating range using conventional design would mean that a current transformer with primary windings comprising a large number of turns of a large core copper wire would be necessary.

This dual requirement has been a major obstacle preventing electronic controlled power switching apparatus with a large operating current range from being used in practical applications, especially in applications in which a compact design is desired. Hence, it is not surprising that electronic controlled power switching apparatus adapted for mounting in wall-sockets rarely provides a current rating range of between 0 to 10 AX (amperes) due to the size of the current transformer required for such a load current rating range. Hence, it is highly desirable if there can be provided electronic controlled power switching apparatus with a relatively large current rating range while maintaining a reasonably compact size to enhance the practical utility of electronic controlled power switching apparatus.

For power switching apparatus with a relatively large current rating, electronic controlled relays with mechanical means for making and breaking the electrical connection between the current conducting terminals of the relays are commonly used. However, the problem of electric arcing during the breaking of the mechano-electrical contacts of the relays, especially in a highly inductive circuit, may cause premature wear-out or even failure of the relays, for example, due to carbonization of the contacts. Furthermore, during the making and breaking transitions, bouncing may occur at the relay contacts and causes arcing. In order to factor in the adverse effect of electrical arcing, relays of a higher power handling rating (and therefore a significantly larger size) are frequently used to provide additional safety margins. For example, a 4 kVA rated relay at 250 Vac voltage rating may be required for a 250V 5 A application at 0.4 power factor to cater for possible arcing due to back EMF during breaking of the contacts, even though the maximum switching voltage which may appear across the current conducting terminals under normal operating conditions would be small.

Likewise, when used in a capacitive circuit, the in-rush current during the making of the relay contacts can be very high and the current rating of a relay may far exceed the "carry current" of a relay, which is the steady state current flowing through the current conducting terminals of the relay under normal operating conditions in order to provide additional safety margin during the making of the current conducting terminals. For example, in a highly capacitive circuit, the in-rush current can be as high as 1000 A even though the steady state operating current may be as low as 10 A.

Hence, it will be beneficial if there can be provided electronic controlled power switching apparatus with relays and with means to alleviate the need of relays of excessive power rating to provide for an adequate safety margin which will inevitably result in a larger apparatus size.

OBJECT OF THE INVENTION

Accordingly, it is an object of the present invention to provide electronic controlled power switching apparatus with line-powered switching controlled circuitry having a wider current rating range while maintaining a reasonably compact size. It is also an object of this invention to provide a line-powered controlled switching apparatus of a compact design using electronic controlled relays as the power switching elements of a power rating comparable to that of the steady "ON-" state operating state conditions. At a minimum, it is an object of this invention to provide the public with a useful choice of electronic controlled power switching apparatus. More specifically, since the coupling of operating power for the operation of the controlled circuitry of a power switching circuitry is more problematic in a two-wire system, it is a specific (but not limiting object) of this invention to provide a line-powered electronic controlled power switching apparatus with a relatively large current rating range suitable for use in a two-wire system. In this specification, the term "two-wire" refers generally to a wiring system in which the switching element of the subject power switching apparatus is connected intermediate between a single input from the AC power source and a single output to the load without loss of generality.

SUMMARY OF THE INVENTION

Broadly speaking, the present invention has described a power switching apparatus adapted for connection between an alternate current power source and a load, said power switching apparatus comprising power switching means for making and breaking electrical connection between said alternate current power source and said load, electronic control circuitry for controlling and operating said power switching means, power coupling means for coupling operating power from said alternate current power source for operation of said electronic control circuitry, said power coupling means including an "ON" state power supply circuit comprising a current transformer with coupled primary and secondary windings, said primary windings being adapted for series connection between said alternate current power source and said load, said secondary windings being connected for coupling power from said primary windings to said electronic control circuitry, said primary windings comprising first and second sub-primary windings of different number of turns of windings of different core diameter, said first sub-primary windings being of a significantly larger current rating than said second sub-primary windings, a current conduction path being provided from intermediate said first and said second sub-primary windings to said power switching means so that a upon detection of a current exceeding the current rating of said second sub-primary windings, current will be caused to flow from said alternate current power source to said load via a current loop comprising said power switching means and said first sub-primary windings, the number of windings of said second sub-primary windings being more than that of said first sub-primary windings and is adapted for providing the operating power of said electronic control circuitry when the current flowing through said primary windings is below a pre-determined threshold level.

In a preferred embodiment, the number of windings of said second sub-primary windings being significantly more than that of said first sub-primary windings such that the operating power of said electronic control circuitry being substantially coupled from said alternate current power source via said second sub-primary windings when the current flowing in said primary windings is below a pre-determined threshold.

In the same or another preferred embodiment, said power switching means comprising an electronic controlled relay with its current conducting terminals connected in series with said first sub-primary windings, said alternate power source, said first sub-primary windings, said relay and said load forming a closed loop while said second sub-primary windings being outside said loop.

According to a preferred embodiment of the present invention, there is provided a power switching apparatus adapted for connection between an alternate current power source and a load, said power switching apparatus comprising power switching means for making and breaking electrical connection between said alternate current power source and said load, electronic control circuitry for controlling and operating said power switching means, power coupling means for coupling operating power from said alternate current power source for operation of said electronic control circuitry, said power coupling means including an "ON" state power supply circuit which comprises a current transformer with coupled primary and secondary windings, said primary windings being adapted for series connection between said alternate current power source and said load, said secondary windings being connected for coupling power from said primary windings to said electronic control circuitry, said primary windings comprising first and second sub-primary windings of different number of turns of windings of different core diameter, said first sub-primary windings being of a significantly larger current rating than said second sub-primary windings, said second switching means and said electronic control circuitry being adapted for providing a path for current flow from said alternate current source to said load when the current flowing through said primary windings is below a pre-determined threshold and during the making and/or breaking of said first switching means.

Preferably, said the current rating of said relay being comparable to that of said first sub-primary windings.

Preferably, an electronic controllable shunting branch being connected in parallel with said relay and across said current conducting terminals of said relay.

Preferably, said electronic controllable shunting branch including a series connection comprising an electronic controllable shunting device and said second sub-primary, said electronic controllable shunting branch being connected in parallel with the electronic controllable current conducting terminals of said relay, wherein said relay, said second sub-primary windings and said shunting device being contained in a circuit loop.

Preferably, said apparatus further comprising zero-voltage detection means for detecting the voltage zero-crossing of said alternate current power source and controlling means for controlling the operation of said power switching means and said shunting device, said controlling means being adapted so that, upon detecting a command to make the connection of the current conducting terminals of said relay, said controlling means activates conduction of said shunting branch to cause a low impedance shunt across said current conducting terminals of said relay after detecting the voltage zero-crossing of said alternate current power source, said current conducting terminals of said relay being caused to conduct after said shunting device having been activated.

Preferably, said shunting device comprising a triac and said controlling means being adapted so that, upon detection of a command to break said current conducting terminals of said relay from current conducting connection, said controlling means will send an actuation signal to said shunting device to prepare for subsequent conduction, wherein, said relay being opened before said triac is in conduction and the opening of said relay causes subsequent conduction of said triac to form a low-impedance shunting branch across said relay.

In an alternative embodiment, said shunting device including an electronic switch such as IGFET, and the like and said controlling means being adapted so that, upon detection of a command to break said current conducting terminals of said relay from current conducting connection, said shunting device will be turned on to form a low-impedance current shunting branch across said current conducting terminals of said relay, said current conducting terminals of said relay being turned off after said shunting device having been conductive, said shunting means being subsequently turned off after said current conducting terminals of said relay having been moved out of conductive contact.

Preferably, said shunting device including a triac, the gate of said triac being controlled by said controlling means, wherein said triac being turned off at zero-current crossing of said load subsequently.

Preferably, the maximum voltage rating of said relay being significantly less than the maximum rated voltage of said alternate current power source.

Preferably, the maximum steady-rate current rating of said relay being comparable to the maximum current rating of said load.

Preferably, for current below a prescribed threshold flowing from said alternate current power source to said load, said relay being non conducting and that power will flow from said alternate current power source to said load via said shunting device.

Preferably, said shunting means including an electronic controlled power switch such as a triac, a MOSFET or an IGBT.

Preferably, said apparatus further comprising monitoring means for ascertaining the current flowing conditions from said alternate current power source to said load, said controlling means being adapted for selectively actuating either said relay or said shunting means for power transfer according to prescribed conditions of said monitoring means.

Preferably, said relay and said shunting means being respectively actuated for power transfer according respectively to a power transfer above or below a threshold value.

Preferably, said sub-primary windings are connected in series, wherein the current rating of said sub-primary windings decreases as said sub-primary windings are further away from said power source.

Preferably, the number of turns of said sub-primary windings increases as the current rating of said sub-primary windings decreases.

Preferably, said first and said second sub-primary windings being connected in series and said first sub-primary windings being intermediate said second sub-primary windings and said alternate current power source.

BRIEF DESCRIPTION OF THE DRAWINGS

Preferred embodiments of the present invention will be explained in further detail below by way of examples and with reference to the accompanying drawings, in which:—

FIGS. 4A and 4B are timing diagrams respectively showing the load current waveform and voltage waveform across the current conducting terminals of a relay of the power switching apparatus of FIG. 1 changing from making to breaking;

FIG. 5A is an exemplary schematic circuit diagram illustrating an example of control circuitry for a typical switching channel for the arrangement of FIG. 1;

FIG. 5B is an exemplary schematic circuit diagram illustrating an example of control circuitry for a typical switching channel for the arrangement of FIG. 2;

DETAILED DESCRIPTION OF THE PREFERRED EMBODIMENTS

Figure 1:
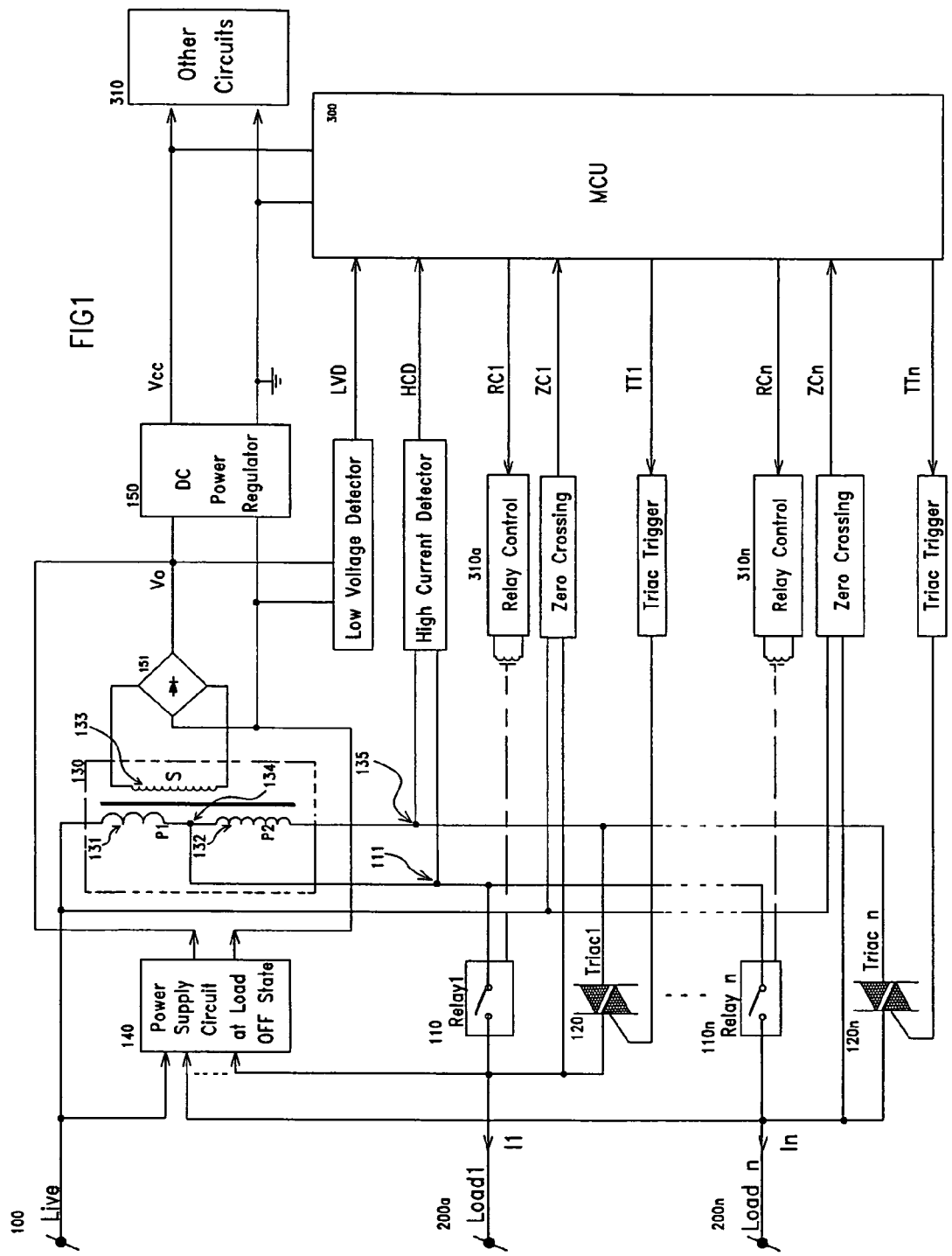
FIG. 1 is a schematic hybrid circuit block diagram showing a multi-channel electronic controlled power switching apparatus of a first preferred embodiment of this invention.

Referring to a first preferred embodiment of a line-powered electronic controlled power switching apparatus 1 of the present invention as shown in FIG. 1, and referring initially for convenience to a first gang or channel of the apparatus, the power switching apparatus includes an input terminal 100 for connection to an alternate current (AC) power source and a plurality of output terminals 200a–200n for connection to a corresponding plurality of loads. The load may be resistive, capacitive or inductive. The power switching apparatus comprises power switching means for making and breaking the electrical connection between the AC power source and the load, electronic controlled circuitry for controlling and operating the power switching means, power coupling means for coupling operating power from the AC power source to the electronic controlled circuitry. The power coupling means includes "ON" state 130 and "OFF" state power coupling circuits 140. The "OFF" state coupling circuit includes a high impedance circuit which couples operating power to the control circuitry during the "OFF" state when the switching element is broken. An example of a suitable "OFF" state coupling circuit is described in U.S. Patent Publication No. 2003-0160517 and is incorporated herein. The "ON" state power coupling circuit 130 comprises a current transformer with coupled primary and secondary windings with its output connected to a rectifying means to provide the necessary DC operating power for the switching apparatus.

The primary windings are connected in series between the AC power source and the load and provide a current passage path for the current flowing from the AC power source to the load. In this preferred embodiment, the primary windings comprise first sub-primary windings 131 and second sub-primary windings 132 which are connected in series. The first sub-primary windings 131 are of a significantly larger current rating than the second sub-primary windings so that a current exceeding the current rating of the second sub-primary windings 132 can pass from the AC power source to the load via the first sub-primary windings 131. As the second sub-primary windings are adapted for handling current of a lesser magnitude, a finer conductor can be used and the number of windings in the second sub-primary windings can be significantly more than the number of windings in the first sub-primary windings without substantially increasing the size of the transformer. By having a second sub-primary windings 132 of a finer conductor and a higher number of windings, a sufficiently high operating power can be coupled across to the secondary windings 133 of the current transformer during the low-current state of the power switching means when under such conditions only a relatively small current will flow through the primary windings. Thus, the second sub-primary windings 132 is provided, in addition to other purposes, to ensure that sufficient operating power is available to the secondary side of the current transformer when only a small current flows from the AC power source to the load, for example, when the power switching apparatus is adapted for a low-current switching application such as a low rating energy saving lamp with a power rating of as low as 10 W.

The power switching means includes an electronic controlled mechanical switching device such as a relay 110. The making and breaking of the current conducting terminals of the relay 110 is controllable by a third terminal which is connected to the controlling means 300 via a relay control circuitry 310a. The current input terminal 111 of the relay 110 is connected to a junction 134 intermediate the first sub-primary windings 131 and the second sub-primary windings 132 so that a complete current loop comprising the AC power source, the first sub-primary windings, the current conducting terminals of the relay and the load can be formed when a high current path is needed. With this configuration, a large current which exceeds the current rating of the second sub-primary windings 132 can flow from the AC power source to the load via the first sub-primary windings 131 while substantially bypassing the second sub-primary windings. Although the first sub-primary windings 131 have a significantly smaller number of windings than the second sub-primary windings 132, the high current flowing through the first sub-primary windings would mean that sufficient power will be coupled to the secondary windings for operation of the electronic controlled circuitry under this large current operating condition. The output terminal 135 of the second sub-primary windings, that is, the terminal not connected to the first sub-primary windings, is connected to an electronic controllable shunting device so that the series combination of the second sub-primary windings 132 and the shunting device 120 forms a controllable shunting or bypassing branch across the current conducting terminals of the relay as and when necessary.

When the switching element of the relay 110 is in the "ON" state and when the current flowing from the AC power source to the load is below a level which is not large enough to provide sufficient operating power to the electronic circuitry "the lower threshold current"), the current sensing means in the apparatus will notify the controlling means. Upon detection of this operating state notification, the controlling means will cause the controllable shunting device to be turned on and the relay to be turned off. Consequently, current will flow through the first and the second sub-primary windings and through the shunting means. As a result, adequate operating power can be coupled across to the secondary side of the power transformer from the totality of the primary windings, even though the current flowing in the first sub-primary windings alone is not sufficient to impart the sufficient operating power to the control circuit. When the power switching apparatus is in the "OFF" state, that is, when both the relay and the shunting means are not conductive, a relatively large voltage, for example, a voltage comparable to the AC power source line voltage, will appear a cross the "OFF" state power coupling power circuit 140, and a reasonable power level for operation of the electronic controlled circuitry will be available without loss of generality.

The electronic control circuitry comprises a controller or a controlling means such as a microcontroller unit (MCU) or a microprocessor which is connected to the secondary side of the current transformer via a voltage regulator 150 and a rectifying means 151. The rectifying means 151 may be a full-wave bridge rectifier and the DC power regulator is adapted to provide regulated DC supply of a plurality of DC voltages for operation of the MCU and other peripheral circuits. The peripheral circuits 310 may include remote-control or touch switching sensing circuitry for receiving control commands from the outside. Of course, the MCU may also be programmed to perform pre-configured switching of the load. In order to control the current path, that is, to decide whether a substantial portion of the current should flow through the relay or the shunting means, a first monitoring means, which can be power or voltage monitoring means, is provided.

An exemplary first monitoring means may comprise a voltage detector which provides information on current flowing through the primary windings by monitoring the voltage at the rectifier output. When the current flowing in the first sub-primary windings is above a threshold value, the output voltage at the bridge rectifying output will exceed a pre-determined value. On the other hand, when the current flowing through the first sub-primary windings drops below a threshold, the rectifier output voltage will also drop below a prescribed level. When this low current level is detected, the controlling means will cause the shunting means to operate so that a substantial portion, if not the entirety, of the load current will flow through the second sub-primary windings as well, thereby imparting sufficient operating power to the controlled circuitry. On the other hand, if the current flowing through the second sub-primary windings 132 exceeds the current rating of the second sub-primary windings 132 (or another pre-determined threshold value, for example, at a safety margin below the current rating), the voltage appearing across the terminals of the second sub-primary windings will exceed a prescribed threshold. At that instant, the controller unit 300 will turn on the relay 110 so that a substantial portion of the current will flow through the relay to avoid damage to the second sub-primary windings. An exemplary operating logic of the switching control by the MCU is shown in Table A below.

TABLE A

| Row | Current Conduction Path | LVD | HCD | Next Conduction Path |
| --- | --- | --- | --- | --- |
| 1 | T | 0 | 0 | T |
| 2 | T | 0 | 1 | R |
| 3 | T | 1 | 0 | Illegal |
| 4 | T | 1 | 1 | Illegal |
| 5 | R | 0 | 0 | R |
| 6 | R | 0 | 1 | Illegal |
| 7 | R | 1 | 0 | T |
| 8 | R | 1 | 1 | Illegal |

T = Triac Conduction
R = Relay Conduction

In the above Table, the symbols have the following meaning and significance with reference to the Figures. As described generally in the description, the primary windings of the current transformer comprise two winding groups, P1 130 and P2 131. P1 comprises windings of copper wire with a larger cross-sectional area and a small number of turns while P2 comprises windings of copper wire with a smaller cross-sectional area and a larger number of turns. For high current rated loads, the current flows through P1 and the relay. For low current rated loads, the current flows through P1 and P2 and the triac. The decision logic is determined by two input signals to the controller, namely LVD and HCD.

In this circuit arrangement, the LVD (Low Voltage Detection) will be high (logic 1) when the output voltage of the secondary windings of the current transformer is below the lower threshold. Thus, LVD="1" or High will suggest that the magnitude of the current flowing through windings P1 alone may not be sufficient to maintain control circuit operation. Upon detection of a high LVD, the controller will activate the shunting means so that current will flow through both P1 and P2. HCD (High Current Detection) will be high when the current flowing through the second sub-primary windings P2 exceed an upper limit. Hence, when HCD="1" or "High", the current flowing through P2 is considered too high and the controlling means will activate the relay and de-activate the triac to direct current flow.

For example, as shown in the first row of Table A, when a substantial portion of the load current is flowing through the shunting means T, and the outputs at both voltage monitoring means LVD and HCD are low, this signifies a low current operation and a small current flowing through the combined primary windings (that is, the series connection of both the first and the second sub-primary windings), the conduction path will be maintained via a shunting means and across the combined primary windings.

On the other hand, when a substantial portion of the load current is flowing through the shunting means T as shown in the second row of Table A and the HCD output is high, which signifies that a current exceeding a prescribed threshold level is flowing through the second sub-primary windings, the MCU will turn on the relay so that the load current will be diverted to flow substantially through the first sub-primary windings and the relay, thereby alleviating possible damage to the second sub-primary windings. The shunting device used in this preferred embodiment includes an electronic controllable shunting device which provides a low-impedance shunt across two of its terminals when an actuating signal is detected. Triacs, MOSFETs and IGBT are examples of suitable shunting devices, although a triac is used in the circuit diagram as a preferred example, since additional zero-current crossing detection circuitry, which are known to persons skilled in the art, would be required if other shunting components or devices are use.

Referring to the operating conditions as shown in row 7 of Table A, the instantaneous power transfer is through the relay and the LVD output is high while the HPD output is low, this operating conditions signify a low current operation of the power switching apparatus. Upon detection of such operating conditions, the MCU will activate the controllable shunting means so that current will begin to flow through the first and second sub-primary windings so that an adequate level of operating power can be coupled across to the secondary windings of the power transformer for operation of the control circuitry.

To avoid logic ambiguity or conduction path oscillation during switching between the various conduction paths due to variations in component characteristics or parameters such as core material characteristics, leakage flux from the current transformer, control circuits power demand, etc., it is desirable that It>Ir, where, Ir=lower limit of the current (I) through P1 that activates LVD during relay conduction
It=upper limit of I through P1&P2 that activates HCD during triac conduction, and
I=sum of all the load currents=I1+I2+I3+ . . . +In More specifically, it is highly preferable if It min>Ir max under all extreme conditions of circuit component variations that can be predictable.

The protection of the relays from electric arcing and/or in-rush currents during making or breaking of the current conducting terminals of the relays will be described in further details below and with reference to the timing diagram of FIG. 3 and FIG. 4.

When a relay is connected to a capacitive load, such as fluorescent lamps with parallel capacitors for power factor correction, the in-rush current during the making of the conducting terminals of the relays can be very high. Experiments showed that the in-rush current can be as high as 24 kA and can last for tens of microseconds which may be sufficient to melt the metal contacts of the relays and causes permanent damage. To alleviate the potential hazards associated with possible current in-rush due to a capacitive load, a voltage zero-crossing detection circuit is provided so that the instant of voltage zero-crossing of the AC power source can be detected monitored and utilized.

Figure 3:
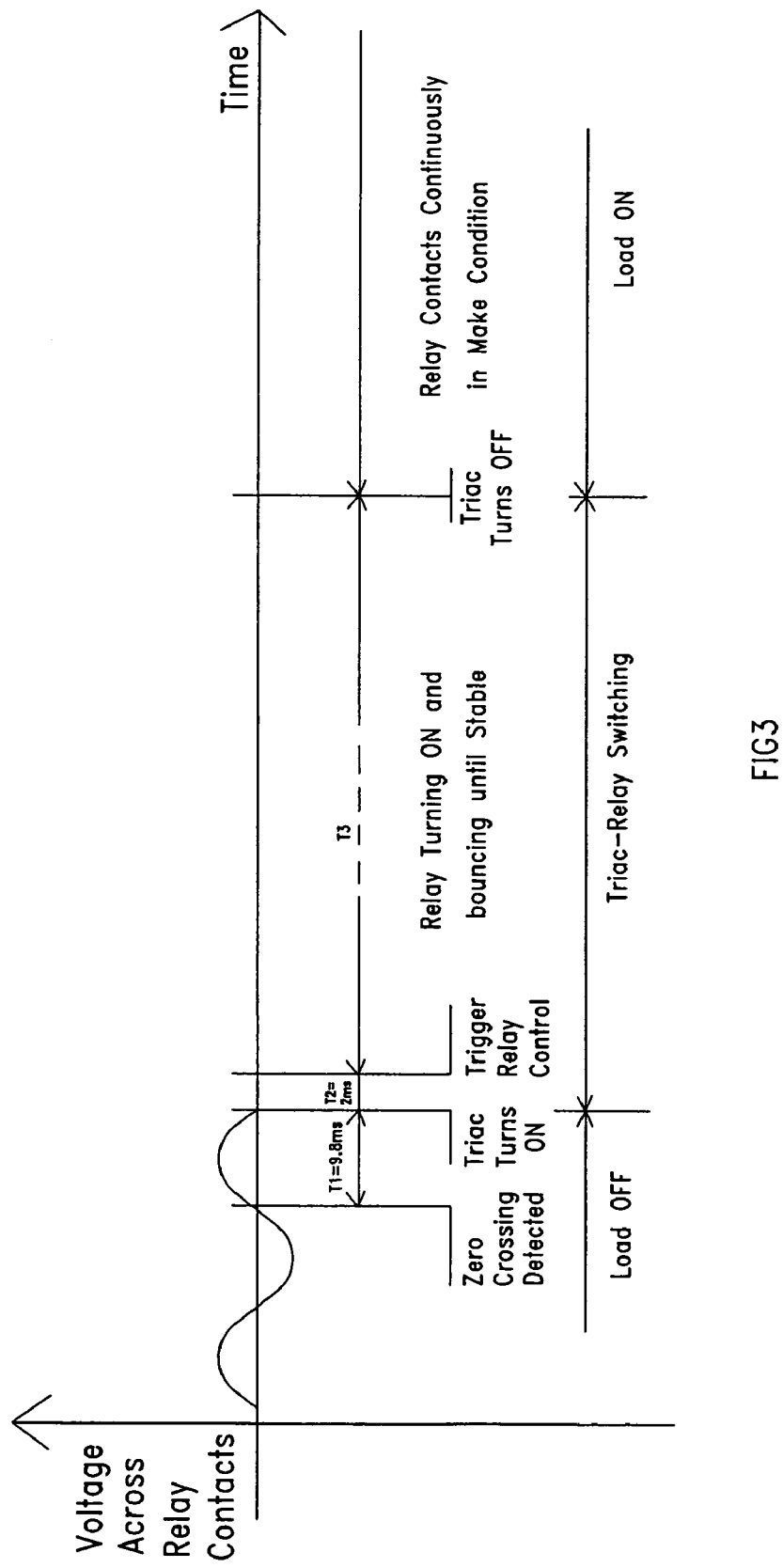
FIG. 3 is a timing diagram showing the voltage across the current conducting terminals of a relay of the power switching apparatus of FIG. 1 changing from breaking to making.

Referring to the timing diagram of FIG. 3, upon detection of the voltage zero-crossing of the AC power source, the zero-crossing detection circuitry will send out a signal to the MCU. When the MCU detects a control command which requests for making of a conduction path between the AC power source and the load, the MCU will first wait for the voltage zero-crossing signal. Once the voltage zero-crossing signal has been detected, the MCU will trigger the shunting means at the next anticipated voltage zero-crossing point so that a low-impedance shunting branch comprising the shunting means and the second sub-primary windings will be formed across the current conducting terminals of the relay.

After this shunting branch has been formed, the MCU will then close the current conducting terminals of the relay via the relay controlled circuitry to make the connection between the current conducting terminals of the relays. After the electrical conditions across the relay contact terminals have been stabilized, the shunting device can be opened again so that a substantial portion of the current will then flow through the relay, instead of the shunting device. As the shunting means was turned on during the voltage zero-crossing of the AC source, the in-rush current will not be damaging and the current flowing through the shunting means will gradually change, thereby alleviating the risk of damage to the relay contact terminals due to current in-rush.

Turning next to the protection of the relay from electric arcing due to change of the current conducting terminals of the relay from making to the breaking when an inductive load is connected and with reference to FIG. 4.

When the relay is to be opened, the controller will prepare for the breaking of the relay by firstly sending an actuation signal to the triac 120 gate. At this instant, because of the inherently low resistance requirements of the switchable conductive element of a relay, the voltage across the two current conducting terminals of the relay 110 will be inherently low. As the current conducting terminals of the triac 120 are connected generally in parallel with the relay 110, such a low voltage drop will not be sufficient to drive the triac into conduction mode, but the triac will be conducting once its terminal voltage exceeds a pre-determined threshold. After the triac has been prepared for conduction, the relay connection can be broken. The voltage across the relay terminals will then rise to a level which is sufficient to cause and sustain triac conduction, (this voltage will be in the range of a few to tens of volts depending on the triac gate current), the triac will then be in conduction mode and provides a low-resistance and low voltage shunting branch to the relay, whereby arcing and back can be alleviated.

As shown in the voltage and current timing diagrams of FIGS. 4A and 4B, upon detection of a command to break the load connection from the AC power source, the MCU sends an actuation signal to drive the triac so that the triac is ready for conduction. As the shunting device is a triac in this specific example, the triac will not be conducting until the relay has been opened and an actuation voltage has been developed across the relay terminals. Thereafter, the relay will be opened and the voltage developed across the relay terminals will cause conduction of the triac. Once the triac is in conduction, a low-impedance low-voltage shunting branch comprising the shunting device and the second sub-primary windings will be formed across the relay terminals whereby the voltage across the relay terminals will be damped. As a result, the back EMF which would otherwise appear across the contact terminals of the relay will be substantially damped or reduced due to the low-impedance shunting path and the likelihood of electric arcing is substantially reduced. After the relay contacts have been stabilized in the breaking position, the MCU will deactivate the triac actuation signal and the shunting path will be turned off at the subsequent zero-current crossing to substantially isolate the load from the AC power source.

Alternatively, a MOSFET or other electronic switching means, such as IGBT, could be used as a shunting device. When such shunting devices are used, the shunting means can be turned on at or near the zero voltage, followed by the opening of the relay conductive elements while the low-impedance, low-voltage shunting branch has been formed. After the relay contacts has been stabilized in the breaking condition, with an additional zero-current crossing detection circuitry, the MCU will turn off the shunting path at zero-current crossing to substantially isolate the load from the AC power source. In the present specific example, a triac is used as a shunting device. When an actuating signal is sent to the triac, the triac will be ready to turn on once the voltage across its conducting terminals has been built up, although there will be some delay between the receipt of the actuation signal and the conduction of the triac. After the relay contacts have been stabilized in the breaking position, the triac is turned off by the MCU at the current zero-crossing point when the load current is reduced to zero. By maintaining current continuity through the shunting path comprising the triac and the turning off characteristics of the triac, the risk of electric arching during the transition from making to breaking of the contact terminals of the relay is substantially reduced.

Referring again to FIG. 1, it will be noted that a plurality of power switching means arranging into a plurality of individually controllable gangs or channels can be connected in parallel so that the individual power switching means can be selectively controlled and activated by the controller (MCU). Of course, the switching apparatus can comprise a single switching channel or a plurality of switching channels to suit the appropriate applications without loss of generality. Furthermore, by having the selective current conduction paths together within a single switching gang, a plurality of switching means (or channels) can be accommodated within a relatively small compartment or unit with all the respective monitoring and control as well as the relay control circuitry.

In the above description, only a first gang or channel of the switching apparatus has been described. It will be understood that the same principles apply to the other gangs without generality.

Figure 2:
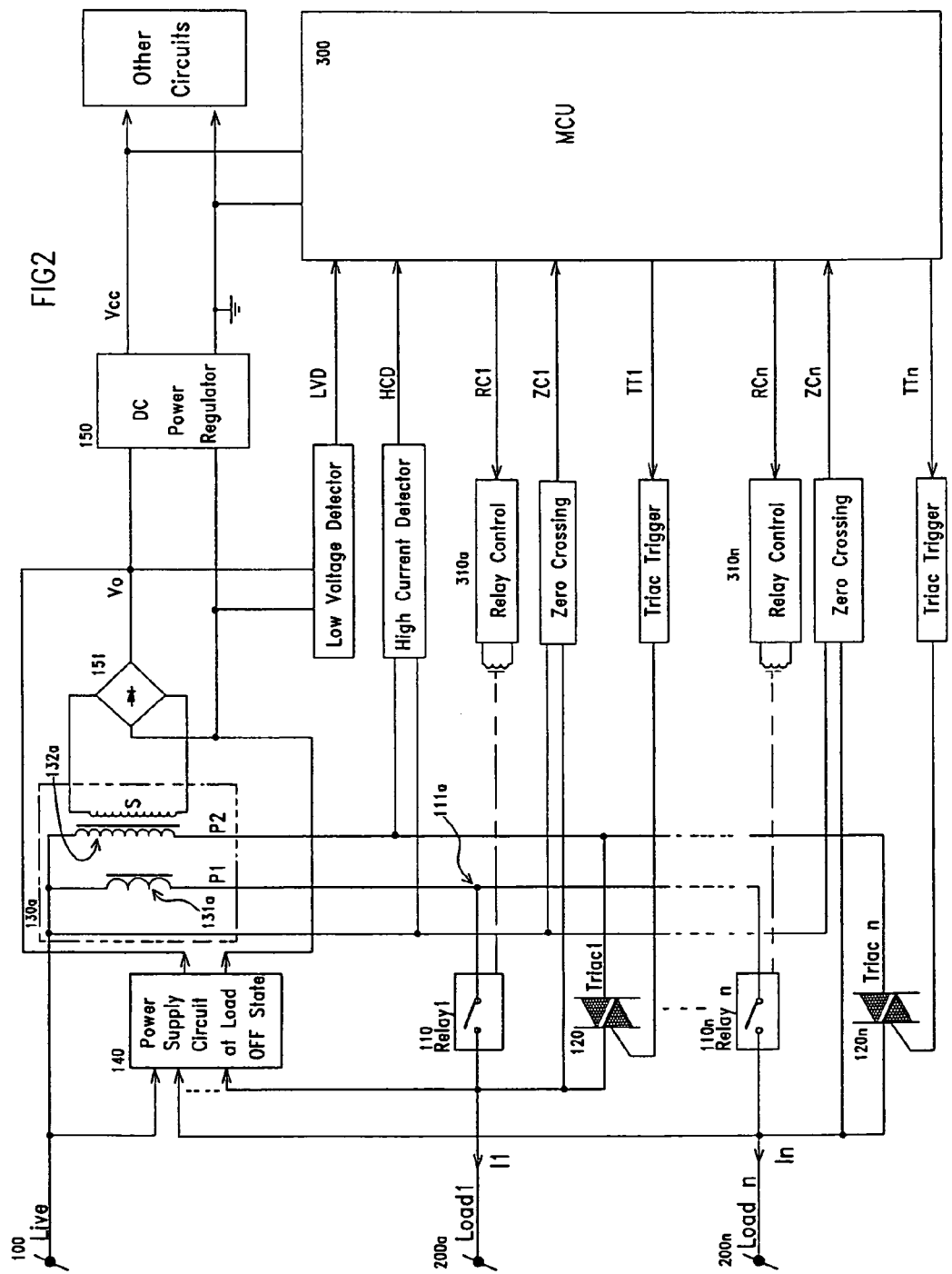
FIG. 2 is a schematic hybrid circuit block diagram showing a multi-channel electronic controlled power switching apparatus of a second preferred embodiment of this invention.

The circuit arrangement of a second preferred embodiment of a line-powered electronic controlled power switching apparatus 2 of the present invention as shown in FIG. 2 comprises components which are substantially identical to that of the first preferred embodiment except that the circuit topology between the first and second sub-primary windings and the relay (the electromechanical switching device) and triac (the shunting means) are different.

Referring to the circuit diagram of FIG. 2, the "ON" state power coupling circuit 130a comprises a current transformer with coupled primary and secondary windings with its output connected to a rectifier means to provide the necessary DC operating power for the switching apparatus 2. The primary windings comprises first sub-primary windings 131a and second sub-primary windings 132a which are connected in parallel, with their common node connected to the input terminal 100. Similar to the first sub-primary windings of the first preferred embodiment, the first sub-primary windings 131a of this second preferred embodiment comprises windings of copper wire having a larger cross-sectional area but with a lesser number of windings compared to the second sub-primary windings to cater for high current rating applications. The output of the first sub-primary windings 131a is connected simultaneously in common to the inputs of a plurality of relays 110—110n at the common node 11a. The second sub-primary windings 132a comprises copper wire of a smaller cross-sectional area but with a larger number of turns to cater for small current rating applications, similar to that of the second sub-primary windings 132 of the first preferred embodiment. The output of the second sub-primary windings 132a is connected simultaneously to the inputs of a plurality of electronic controllable shunting means which are also triacs as a convenient example. The first and the second sub-primary windings and their respective circuits provide alternative current paths so that the controlling means 300 can select the appropriate current circuits upon detection of the current level in the primary or sub-primary windings. For example, when the current flowing in the second sub-primary windings exceeds a pre-determined threshold which signifies that the current rating of the second sub-primary windings may be exceeded, the controller 300 can turn on the relay 110 and turn off the triac 120 so that the large current can be confined in the first sub-primary windings of a larger current rating. Likewise, when the current flowing in the first sub-primary windings 131a drops below a pre-determined threshold value which signifies that the operating power can be obtained from the first sub-primary windings may be insufficient, the controller 300 will cause the triac 120 (or 110n) to be turned on and relay 110 (or 120n) to be turned off so that the current will be directed into the windings with a higher number of turns to impart sufficient operating power to the operating circuit of the switching apparatus 2. The relay protection circuitry, as described in the first embodiment above, is substantially identical as that of the first preferred embodiment and will not be repeated without loss of generality. FIGS. 5a and 5b illustrate respectively circuits typical of the first and second embodiments with only a single gang shown for simplicity.

Figure 6:
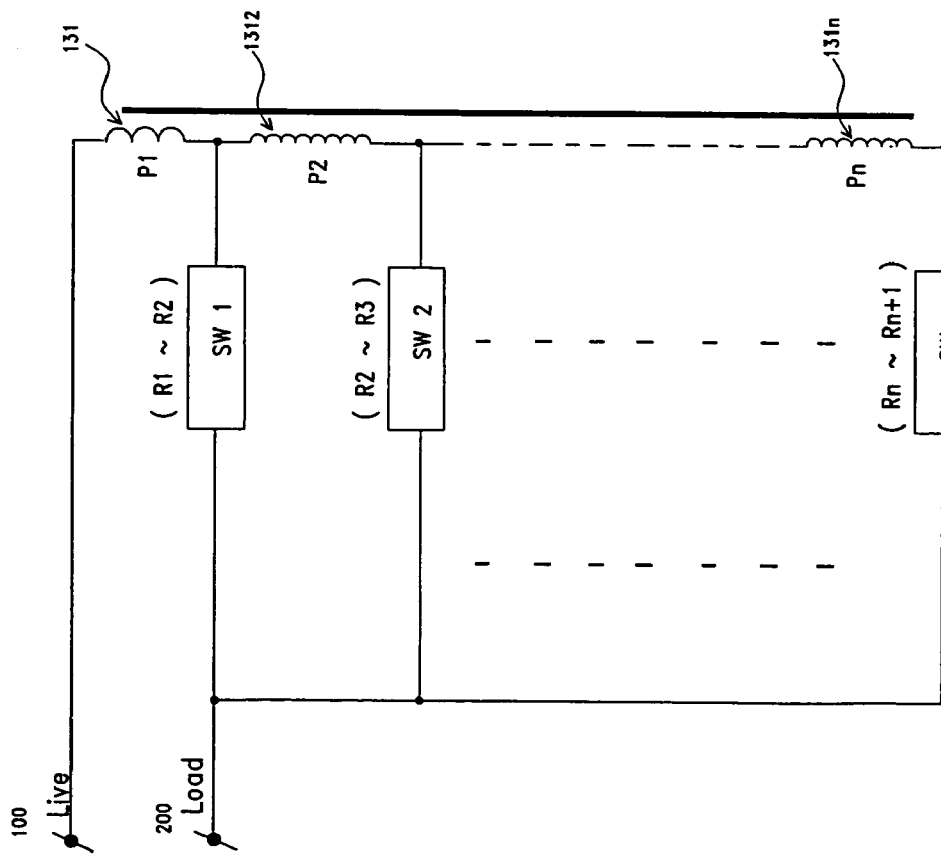
FIG. 6 is a schematic topological circuit diagram showing another preferred embodiment with a plurality of cumulative or serial current shunting branches for an increased range of load current illustrating a general principle of the embodiment of FIG. 1.

The circuit topology as shown in FIG. 6 shows a modified and generalized embodiment of the series configuration of the first preferred embodiment of FIG. 1. The primary windings of the current transformer on the primary side of the power coupling means comprises a plurality of sub-primary windings connected in series, to further increase the operating current range of the switching apparatus.

Referring to the circuit arrangement of FIG. 6, the primary windings comprises a plurality of sub-primary windings, namely, P1, P2, . . . Pn. Each of the sub-primary windings have a different number of turns $(N)p_i$ and in which $(N)P1<(N)P2<(N)P3< \ldots <(N)Pn-1<(N)Pn$. Here $(N)P_i$ means the number of turns of the specific sub-primary winding i and the core diameter of the copper conductor in each of the sub-primary windings is designated by (D)Pi. A plurality of switching devices are connected in parallel between the output node of each of the sub-primary windings and the load. As a convenient example, the serially connected sub-primary windings and the switches have the following relationships:—

R1>R2>R3> . . . >Rn−1>Rn
(N)P1<(N)P2<(N)P3< . . . (N)Pi . . . <(N)Pn−1<(N)Pn
(D)P1>(D)P2>(D)P3> . . . (D)Pi . . . >(D)Pn−1>(D)Pn where, Ri means the volt-ampere rating of the switching devices, (N)Pi=the number of turns of the respective sub-primary windings and, D represents the core diameter of the conductive wire of the specific sub-primary windings.

In this specific example, the core diameter of the conductive winding of the sub-primary windings progressively decreases while the number of turns of the sub-primary windings increases as the sub-windings are further away from the live terminal or the input node 100. In addition, the power rating of the switching devices decreases as their input terminals are further away from the life node so that a large current can be branched off before reaching sub-primary windings of lower current rating.

Figure 7:
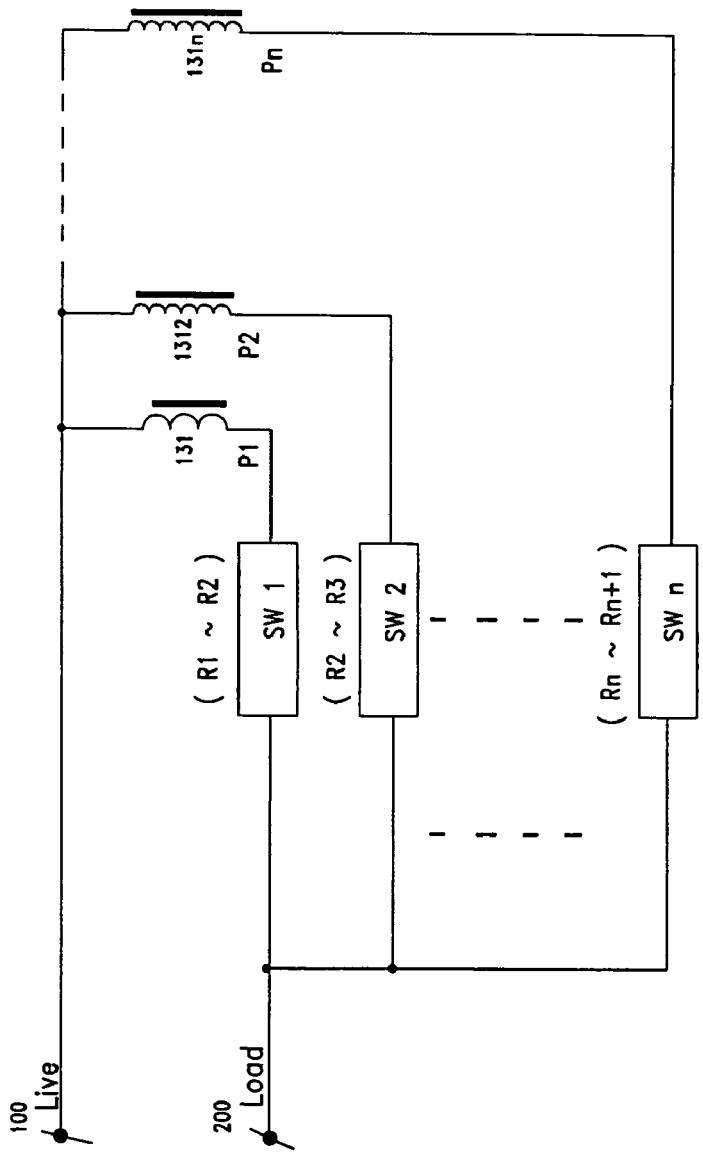
FIG. 7 is a schematic topological circuit diagram showing another preferred embodiment with a plurality of parallel current shunting branches for an increased range of load current illustrating a general principle of the embodiment of FIG. 2.

FIG. 7 shows a generalized circuit topology of the current splitting arrangement of the embodiment of FIG. 2. In this topology, a plurality of sub-primary windings of different current ratings are arranged in parallels so that a common node of the sub-primary windings are connected to the live terminal while their respective output terminals are connected to the input of the respectively connected switching devices which can be relays or other switches or a combination of the same. As a convenient example, the parallel sub-primary windings have the following relationships:—

R1>R2>R3> . . . >Rn−1>Rn
(N) P1<(N)P2<(N)P3< . . . (N)Pi . . . <(N)Pn−1<(N)Pn
(D)P1>(D)P2>(D)P3> . . . (N)Pi . . . >(D)Pn−1>(D)Pn

By connecting a switching device having a large current rating to a sub-primary windings of a larger rating and so on and so forth, an electronic controlled line-powered switching apparatus of a wide current range can be obtained in accordance with the principles of the present invention with reference to the examples described before.

Specific Example

In a specific example of a switching apparatus with the topology of FIGS. 5 and 5*a* for fitting into a 35 mm wall socket conforming to British standard BS4662, with the number of gangs or channels n=4 and with a load rating range of between 15 to 1600 VA, the following are the exemplary components and their descriptions.

The electromechanical switching device is an Omron G6S relay with a Rated Carry Current of 2 A which means the maximum recommended switching current should not exceed 2 A. For application in a switching Voltage=250, the normal maximum switching current (without protection) would be under 0.26 A so as not to exceed the maximum switching current. The electronic controllable shunting means is a triac of the ST T4 series which is specified for a current flow between 0.06 and 0.75 A. As an example, when the current flowing through the triac is approaching or at 0.75 A, the relay will be switched on so as to shift current passage from the triac to the relay. The current transformer has an amorphous core. The secondary windings has 1000 turns of 0.1 mm diameter copper wire. The primary windings composed of two groups, P1 and P2. P1 has 30 turns of 1.0 mm diameter copper wire. P2 has 150 turns of 0.3 mm diameter. During relay conduction, current passes through P1. The wire of P1 with a core diameter of 1 mm can cater the maximum current up to 8 A without excessive heat generation. During triac conduction, current passes through both P1 and P2. The number of turns in P2 can generate a DC power of about 20 mW at the secondary windings for control circuit. At the same time, it can also allow current up to 0.75 A flowing through without excessive heat generation of transformer. Prevention of Conduction Path Oscillation Considering component variations, the maximum lower limit current of relay, Ir max=0.5+d1 A, where d1 is the maximum allowable current deviation, at which the LVD changes from low to high, and 0.5 A is a nominal value. On the other hand, the minimum upper limit current of triac (taking all the component variations into consideration) is It min=0.75−d2 A where d2 is the maximum current deviation, at which the HCD changes from low to high, and 0.75 A is the nominal value. To prevent conduction path oscillation, It min>Ir max, i.e. 0.25>d1+d2 for the present example.

In other words, sum of the deviations of relay and triac conduction current at state changing must be less than 0.25 A. If the deviation is larger than 0.25 A, then the nominal values of Ir and It must be selected such than their differences have a higher value. On the other hand, the higher the value, the narrower will be the range of load ratings. So, a balance value has to be selected for optimum performance.

While the present invention has been explained by reference to the examples or preferred embodiments described above, it will be appreciated that those are examples to assist understanding of the present invention and are not meant to be restrictive. The scope of this invention should be determined and/or inferred from the preferred embodiments described above and with reference to the Figures where appropriate or when the context requires. In particular, variations or modifications which are obvious or trivial to persons skilled in the art, as well as improvements made thereon, should be considered as falling within the scope and boundary of the present invention.

Furthermore, while the present invention has been explained by reference to a power switching apparatus with power switching means comprising a parallel disposition of a relay and a triac, it should be appreciated that the invention can apply, whether with or without modification, to other combination of switching means or devices without loss of generality.

What is claimed is:

1. A power switching apparatus adapted for connection between an alternate current power source and a load, said power switching apparatus comprising power switching means for making and breaking electrical connection between said alternate current power source and said load, electronic control circuitry for controlling and operating said power switching means, power coupling means for coupling operating power from said alternate current power source for operation of said electronic control circuitry, said power coupling means including an "ON" state power supply circuit comprising a current transformer with coupled primary and secondary windings, said primary windings being adapted for series connection between said alternate current power source and said load, said secondary windings being connected for coupling power from said primary windings to said electronic control circuitry, said primary windings comprising first and second sub-primary windings of different number of turns of windings of different core diameter, said first sub-primary windings being of a significantly larger current rating than said second sub-primary windings, a current conduction path being provided from intermediate said first and said second sub-primary windings to said power switching means so that a upon detection of a current exceeding the current rating of said second sub-primary windings, current will be caused to flow from said alternate current power source to said load via a current loop comprising said power switching means and said first sub-primary windings, the number of windings of said second sub-primary windings being more than that of said first sub-primary windings and is adapted for providing the operating power of said electronic control circuitry when the current flowing through said primary windings is below a pre-determined threshold level.

2. A switching apparatus of claim 1, wherein the number of windings of said second sub-primary windings being significantly more than that of said first sub-primary windings such that the operating power of said electronic control circuitry being substantially coupled from said alternate current power source via said second sub-primary windings when the current flowing in said primary windings is below a pre-determined threshold.

3. A switching apparatus of claim 1, wherein said power switching means comprising an electronic controlled relay with its current conducting terminals connected in series with said first sub-primary windings, said alternate power source, said first sub-primary windings, said relay and said load forming a closed loop while said second sub-primary windings being outside said loop.

4. A switching apparatus of claim 3, wherein the current rating of said relay being comparable to that of said first sub-primary windings.

5. A switching apparatus of claim 3, wherein an electronic controllable shunting branch being connected in parallel with said relay and across said current conducting terminals of said relay.

6. A switching apparatus of claim 5, wherein said electronic controllable shunting branch including a series connection comprising an electronic controllable shunting device and said second sub-primary, said electronic controllable shunting branch being connected in parallel with the electronic controllable current conducting terminals of said relay, wherein said relay, said second sub-primary windings and said shunting device being contained in a circuit loop.

7. A switching apparatus of claim 6, further comprising zero-voltage detection means for detecting the voltage zero-crossing of said alternate current power source and controlling means for controlling the operation of said power switching means and said shunting device, said controlling means being adapted so that, upon detecting a command to make the connection of the current conducting terminals of said relay, said controlling means activates conduction of said shunting branch to cause a low impedance shunt across said current conducting terminals of said relay after detecting the voltage zero-crossing of said alternate current power source, said current conducting terminals of said relay being caused to conduct after said shunting device having been activated.

8. A switching apparatus of claim 7, wherein said controlling means being adapted so that, upon detection of a command to break said current conducting terminals of said relay from current conducting connection, said shunting device will be turned on to form a low-impedance current shunting branch across said current conducting terminals of said relay, said current conducting terminals of said relay being turned off after said shunting device having been conductive, said shunting means being subsequently turned off after said current conducting terminals of said relay having been moved out of conductive contact.

9. A switching apparatus of claim 8, wherein said shunting device including an electronic switch such as IGFET, and the like.

10. A switching apparatus of claim 7, wherein said shunting device comprising a triac and said controlling means being adapted so that, upon detection of a command to break said current conducting terminals of said relay from current conducting connection, said controlling means will send an actuation signal to said shunting device to prepare for subsequent conduction, wherein, said relay being opened before said triac is in conduction and the opening of said relay causes subsequent conduction of said triac to form a low-impedance shunting branch across said relay.

11. A switching apparatus of claim 10, wherein the gate of said triac being controlled by said controlling means, wherein said triac being turned off at zero-current crossing of said load subsequently.

12. A switching apparatus of claim 10, wherein the maximum voltage rating of said relay being significantly less than the maximum steady-state rated voltage of said alternate current power source.

13. A switching apparatus of claim 12, wherein the maximum current rating of said relay being comparable to the maximum steady-state current rating of said load.

14. A switching apparatus of claim 6, wherein for current below a prescribed threshold flowing from said alternate current power source to said load, said relay being non conducting and that power will flow from said alternate current power source to said load via said shunting device.

15. A switching apparatus of claim 14, wherein said shunting means including an electronic controlled power switch such as a triac, a MOSFET or an IGBT.

16. A switching apparatus of claim 15, further comprising monitoring means for ascertaining the current flowing conditions from said alternate current power source to said load, said controlling means being adapted for selectively actuating either said relay or said shunting means for power transfer according to prescribed conditions of said monitoring means.

17. A switching apparatus of claim 16, wherein said relay and said shunting means being respectively actuated for power transfer according respectively to a power transfer above or below a threshold value.

18. A switching apparatus of claim 1, wherein said sub-primary windings are connected in series, the current rating of said sub-primary windings decreases as said sub-primary windings are further away from said power source.

19. A switching apparatus of claim 18, the number of turns of said sub-primary windings increases as the current rating of said sub-primary windings decreases.

20. A power switching apparatus adapted for connection between an alternate current power source and a load, said power switching apparatus comprising power switching means for making and breaking electrical connection between said alternate current power source and said load, electronic control circuitry for controlling and operating said power switching means, power coupling means for coupling operating power from said alternate current power source for operation of said electronic control circuitry, said power coupling means including an "ON" state power supply circuit which comprises a current transformer with coupled primary and secondary windings, said primary windings being adapted for series connection between said alternate current power source and said load, said secondary windings being connected for coupling power from said primary windings to said electronic control circuitry, said primary windings comprising first and second sub-primary windings of different number of turns of windings of different core diameter, said first sub-primary windings being of a significantly larger current rating than said second sub-primary windings, said second switching means and said electronic control circuitry being adapted for providing a path for current flow from said alternate current source to said load when the current flowing through said primary windings is below a pre-determined threshold and during the making and/or breaking of said first switching means.

21. A switching apparatus according to claim 20, wherein said first and said second sub-primary windings being connected in series and said first sub-primary windings being intermediate said second sub-primary windings and said alternate current power source.

* * * * *